United States Patent [19]

Costahaude et al.

[11] Patent Number: 5,832,785
[45] Date of Patent: Nov. 10, 1998

[54] VEHICLE HANDLEBAR

[75] Inventors: Mark Costahaude, Moorpark; Frank Kashare, Agoura, both of Calif.; Hu Shao Yuan, Taipei, Taiwan

[73] Assignees: Style'n USA, Inc., Woodland Hills, Calif.; Accord Enterprise Corp., Taipei, Taiwan

[21] Appl. No.: 593,470

[22] Filed: Jan. 29, 1996

Related U.S. Application Data

[63] Continuation of Ser. No. 136,661, Oct. 14, 1993, abandoned.

[51] Int. Cl.⁶ .................................................. B62K 21/12
[52] U.S. Cl. ........................................ 74/551.1; 74/551.4
[58] Field of Search .............................. 74/551.1, 551.4, 74/551.5, 551.6, 551.8, 551.9; 280/279, 288.4, 288.3; D12/107

[56] References Cited

U.S. PATENT DOCUMENTS

| | | |
|---|---|---|
| D. 30,821 | 5/1899 | Scandrett . |
| D. 101,953 | 9/1936 | Henry . |
| D. 301,027 | 5/1989 | Borromeo . |
| 610,328 | 9/1898 | Martin . |
| 822,487 | 6/1906 | Smith . |
| 1,331,875 | 2/1920 | Roberts .................................. 74/551.9 |
| 2,004,089 | 6/1935 | Anderson . |
| 2,216,833 | 10/1940 | Barry ..................................... 74/551.1 |
| 4,635,499 | 1/1987 | McMurtrey . |
| 4,852,423 | 8/1989 | Mikami et al. ........................ 74/551.9 |
| 4,903,542 | 2/1990 | Borromeo . |
| 5,117,708 | 6/1992 | Boyer . |
| 5,257,552 | 11/1993 | Boyer et al. ........................... 74/551.1 |

FOREIGN PATENT DOCUMENTS

| | | | |
|---|---|---|---|
| 196394 | 6/1989 | Japan ................................... 74/551.1 |
| 4151387 | 5/1992 | Japan ................................... 74/551.1 |

*Primary Examiner*—Charles A. Marmor
*Assistant Examiner*—Peter Kwon
*Attorney, Agent, or Firm*—Loeb & Loeb LLP

[57] ABSTRACT

A handlebar suitable for use on vehicles such as motorcycles, bicycles, tricycles and jet skis is described. The handlebar has a constant outside diameter, but has an inside diameter at its center section different than the inside diameter at its end sections. The handlebar may comprise an outer tube of standard outer dimensions and an inner tube centered in the outer tube for added rigidity in the central positions. The handlebar provides added rigidity over typical handlebars while permitting use of standard size components with the handlebar. A method of manufacturing such a handlebar is also described.

13 Claims, 5 Drawing Sheets

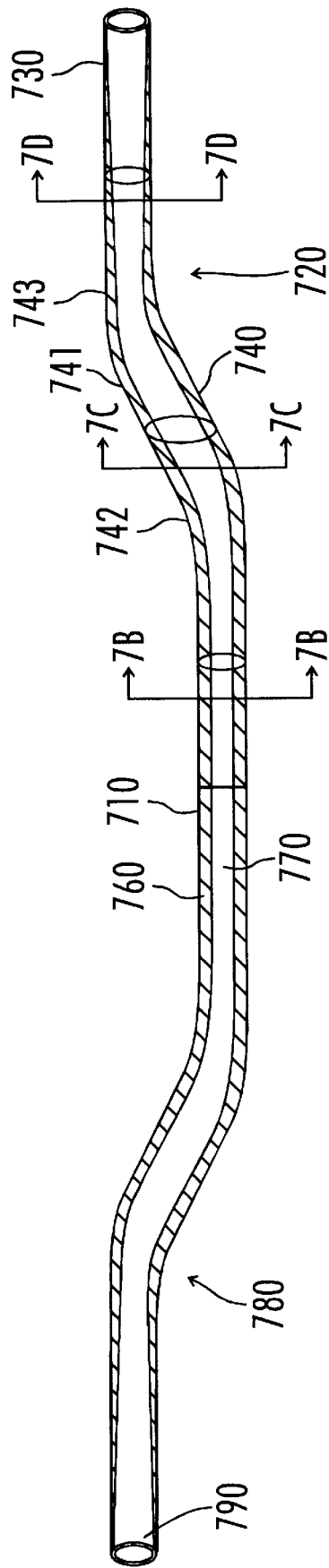
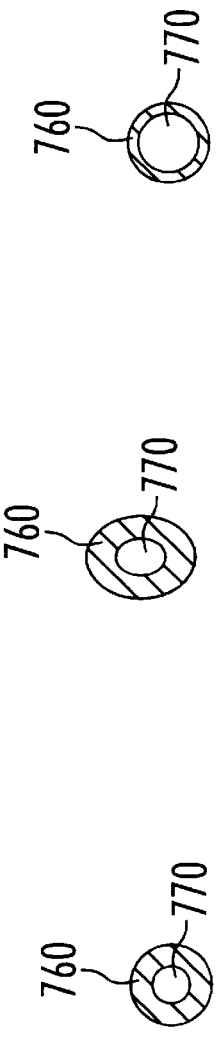
FIG. 7A
FIG. 7B
FIG. 7C
FIG. 7D

VEHICLE HANDLEBAR

This is a continuation of application Ser. No. 08/136,661, filed Oct. 14, 1993, now abandoned.

BACKGROUND OF THE INVENTION

1. Field of the Invention

The present invention relates generally to handlebars for powered and unpowered vehicles such as motorcycles, bicycles, tricycles, all terrain vehicles and jet skis.

2. Description of Related Art

Conventional handlebars for vehicles such as off road motorcycles, dirt bikes, ATBs (all terrain bikes), and BMX (bicycle moto-cross) bikes typically comprise a bent bar with a handle at each end. A front plan view of a common prior art handlebar 100 is illustrated in FIG. 1. FIG. 2 is a top plan view of the prior art handlebar 100. The common prior art handlebar 100 comprises a bent, elongated tube 110 having a central section 120 and oppositely disposed end sections 130 and 140 which are mirror images of one another. The tube 110 typically has a uniform diameter 160.

The handlebar art has generally adopted ⅞ inch as a standard outside diameter for handlebar tubes. Hence, a wide array of complementary parts may be used in conjunction with a standard handlebar. For example, grips or handle members, preferably made of polyvinyl or rubber, can be fitted over a portion of each end section 130, 140. Other parts commonly used in conjunction with a handlebar include clamps for coupling the handlebar to a steering system of the vehicle, and various clamps for coupling cables, brake and clutch levers, and other devices to the handlebar. Standardization on the ⅞ inch diameter has resulted in substantial economies to thereby reduce costs, increase availability and interchangeability of parts in general, and increase the variety of parts available.

However, while the diameter of approximately ⅞ inch provides for ideal interoperability with other parts, it typically provides the middle section 120 and bent sections 132 and 142 with an undesirably thin member for absorbing the stresses, strains and shocks imparted to the handlebars 100 from vigorous riding. Handlebars are frequently used in high stress situations such as off road riding or dirt bike riding, and typical prior art handlebars often fail under the high stress of such situations.

In order to strengthen the handlebars, prior art handlebars commonly include a crossbar 150 which is attached to the handlebar 100 at the locations of the intersection of the end section 130 with bent section 132 and the intersection of the end section 140 with bent section 142. There are two conventional methods by which the crossbar 150 is attached. In one method, the crossbar 150 is welded in place. In the second method, the crossbar 150 is clamped in place with a pair of clamps that are tightened with bolts.

In operation, the handlebar 100 is attached to a vehicle along the length of the center section 120 and usually at two spaced apart locations, and such that the crossbar 150 faces the rider of the vehicle. Because the center section 120 and bent sections 132, 142 are typically not strong enough to withstand large forces, the crossbar 150 is provided to prevent the handlebars 100 from buckling if the vehicle should bump into something or crash to the ground. However, in the event of an impact, the crossbar 150 typically causes a permanent compression set to occur in the tube 110. This is undesirable because subsequent impacts induce additional compression, which may lead to failure of the handlebar 100. In addition, the crossbar 150 is typically extraneous to steering the vehicle, so it adds weight for the greater portion of use while only improving performance for a small portion of use. Furthermore, because of the direction of attachment of the crossbar 150, it typically only reinforces the handlebars 100 in the vertical direction, not in the horizontal direction.

Therefore, the major disadvantage of prior art handlebars is that they require a crossbar for strength. However because the crossbar provides rigid support at its attachment points to the bent tube, it forces stress concentrations there, which tend to take a permanent set in falls. The crossbar also typically constrains shock absorption by tube 110 which would soften shock loads to the rider when gripping the ends 130, 140 of the handlebar.

A handlebar which resolves some of the above problems is disclosed in U.S. Pat. No. 5,117,708, entitled "Handlebars for Motorcycles, Dirt Bikes, All Terrain Vehicles and Jet Skis," to Boyer et al. According to Boyer, there is provided a hollow-tube handlebar without a crossbar, but having an outer diameter which is larger in the center, and which tapers to the ends. Further according to Boyer, the inner diameter of the tube should also be tapered such that it is larger in the center and tapers in to the ends. Boyer teaches that any cross-section of the tube should have the same amount of material, such that the tube has its thickest walls at the end sections and thinnest walls in the center section.

Regardless of whether such a handlebar is more durable than a standard handlebar, such a handlebar suffers from substantial problems. First, because the center of the handlebar is thicker than the ends, at least one of the center or the ends is necessarily a non-standard size. This means that, if the center is thicker than the standard of ⅞ inch, then a special clamp is required. If the ends are thinner than the standard of ⅞ inch, then special grips and other handle members are required. Because such special parts are necessary, there is typically incurred increased cost of parts, reduced availability and interchangeability, and limited selection. Vehicles using high strength handlebars as taught by Boyer are commonly used in remote locations, but replacement parts to fit non-standard size handlebars may not be available. Thus, if any part of the handlebar assembly breaks, spare parts may not be available unless carried with the vehicle.

An additional problem with such handlebars is that, because of the relative thickness of the ends, the end sections have been found to vibrate more than the center section, thereby increasing rider discomfort and fatigue. Since fatigue is a major factor in vehicle accidents of any kind, this added vibration effect is undesirable.

Thus, there is a significant need for an improved configuration for handlebars which provides greater strength, improved shock absorption, and improved steering capability, while preserving the numerous advantages inherent in standard uniform diameter handlebars. These objects and others are provided in the vehicle handlebar of the present invention.

SUMMARY OF THE INVENTION

The invention is directed to a handlebar which provides greater durability than typical handlebars and retains the industry standard outer diameter. To achieve the desired goals, a handlebar of the present invention has an outer diameter at the center and ends of ⅞ inch to provide interchangeability of parts. To improve strength, the inner diameter of the handlebar is varied, such that the center has a smaller inner diameter, and the ends have a larger inner diameter.

According to one embodiment, the handlebar comprises a single tube manufactured to have varying inner diameter.

According to a second embodiment, the handlebar comprises an outer tube and an inner tube disposed within and centered with the outer tube. The outer tube provides a constant outer diameter. Preferably, the outer diameter is ⅞ inch. The handlebar defines a hollow which extends through and between the end sections and through the center section. The inner tube, since it is disposed at the center section of the outer tube, provides a thicker wall to the center section than the wall of the end sections. Hence, the center section provides increased strength at the clamp, and the end sections provide reduced vibration.

The end sections may include bent sections proximate the center section which are oval shaped. The inner tube may be made long enough to extend to the bent sections or may only extend along the center.

DESCRIPTION OF THE DRAWINGS

These and other advantages of the present invention are best understood with reference to the drawings, in which:

FIG. 7A is a partial front cross-section of an embodiment of a handlebar in accordance with an aspect of the invention;

FIG. 7B is a cross-section of the center section shown in FIG. 7A;

FIG. 7C is a cross-section of the tube at the middle portion of the bent section of the handlebar of FIG. 7A; and FIG. 7D is a cross-section of the handlebar of FIG. 7A at the distal end.

DETAILED DESCRIPTION OF THE DISCLOSED EMBODIMENTS

A vehicle handlebar according to an embodiment of the invention is described. Throughout this description, the preferred embodiment and examples shown should be considered as exemplars, rather than limitations on the apparatus of the present invention.

A handlebar suitable for use on vehicles such as motorcycles, bicycles, tricycles and jet skis will now be described. Handlebars in accordance with the invention provide added strength over standard handlebars. Hence, handlebars of the present invention are especially well suited for off-road use, such as for motorcross motorcycles and bicycle moto-cross.

A hollow handlebar typically has a rounded, circular wall. At any point along the handlebar, the thickness of the wall should be considered to be the distance from the outside face of the wall to the inside face of the wall. For a handlebar having a circular cross section, the thickness is half the difference between the outer diameter and the inner diameter.

Handlebars in accordance with the present invention may take at least two forms. First is the double-tube form. Accordingly, the handlebar comprises a main outer tube, with an inner tube to provide added support. Second is the single tube embodiment, wherein the inner diameter of the tube is varied in accordance with the invention for added strength. The double-tube embodiment will be first described, then the single tube embodiment will be described.

Figure 1:
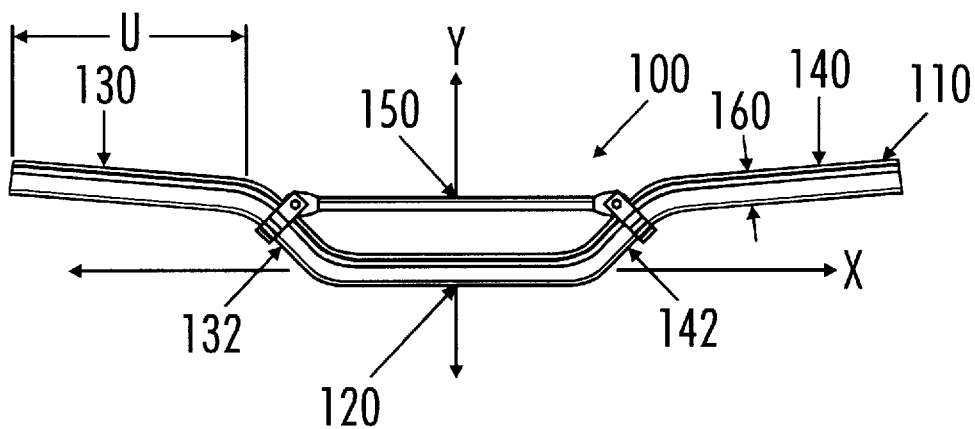
FIG. 1 is a front plan view of a prior art handlebar.
Figure 2:
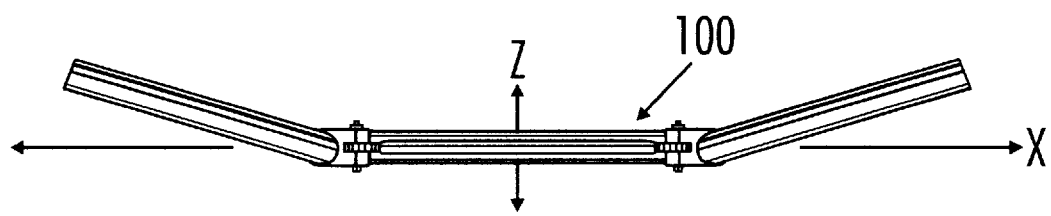
FIG. 2 is a top plan view of the prior art handlebar shown in FIG. 1.
Figure 3A:
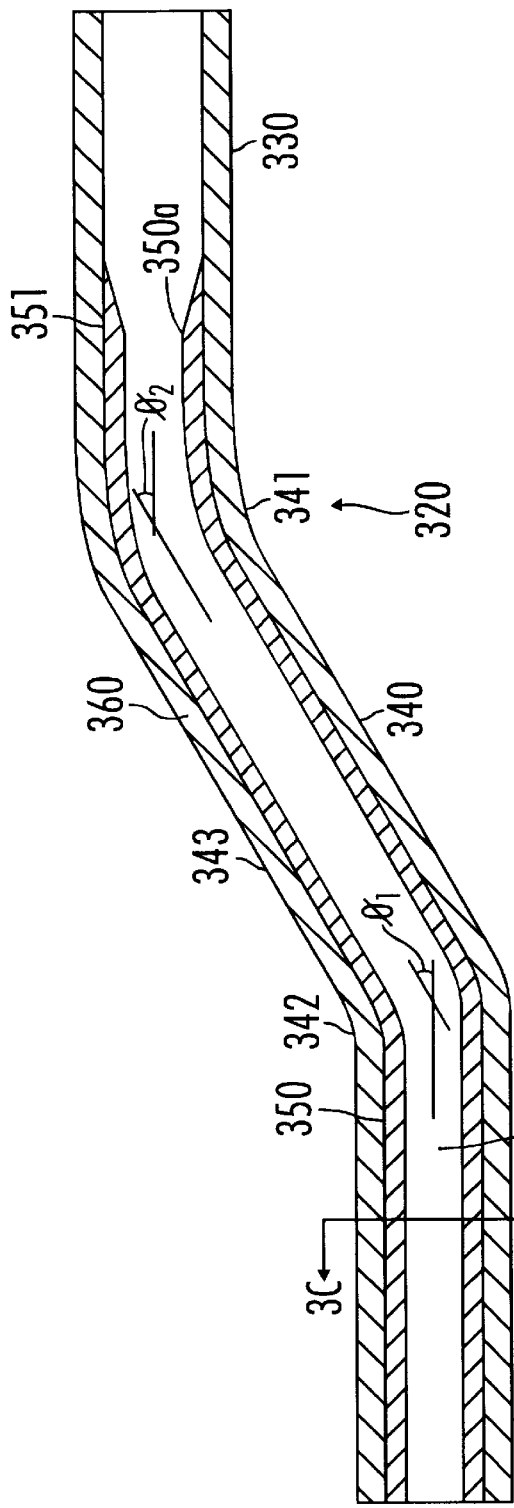
FIG. 3A is a partial front cross-section of an embodiment of a handlebar in accordance with an aspect of the invention.

Referring now to FIG. 3A there is shown a partial front cross section of an embodiment of a handlebar in accordance with the invention. The handlebar comprises a first end section 320, a center section 310, and a second end section (not shown) which mirrors the first end section 320. The first end section 320 preferably comprises a bent section 340 proximate the center section 310 and a distal end 330. The bent section 340 preferably comprises a proximal bend 342, a middle portion 343 and a distal bend 341. The handlebar is bent at the proximal bend 342 at an angle $\phi_1$ of approximately 45°. The handlebar is bent at the distal bend 341 at an angle $\phi_2$ preferably less than 45°.

Figure 3B:
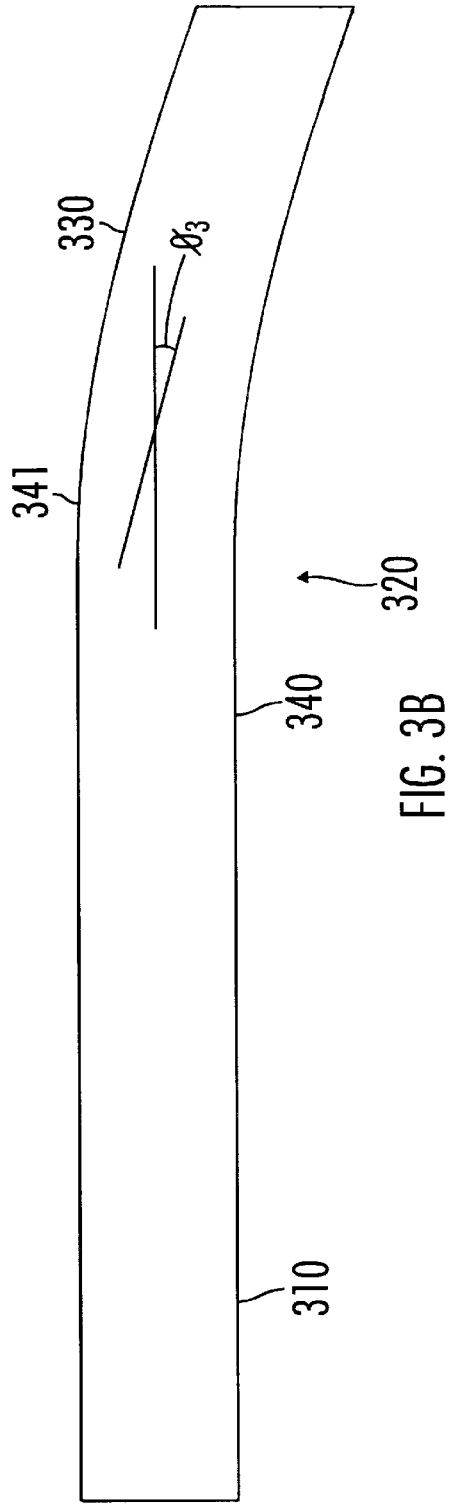
FIG. 3B is a partial top plan view of the handlebar shown in FIG. 3A.

As shown in FIG. 3B, which is a partial top view of the handlebar shown in FIG. 3A, the distal bend 341 is also preferably bent at a small angle $\phi_3$ in a different plane than the proximal bend 342.

Figure 3C:
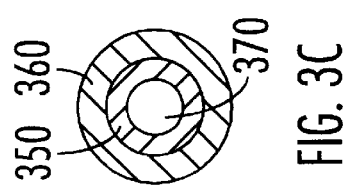
FIG. 3C is a side section of the handlebar shown in FIG. 3A.

Referring now to FIG. 3C, there is shown a cross section of the handlebar shown in FIG. 3A along reference line 3C. At the center section 310, there are provided an outer tube 360 and an inner tube 350. The handlebar preferably also defines a hollow 370, which preferably extends from and through the end section 330 through the center section 310 to the second end section (not shown), i.e., the complete length of the handlebar. The inside of the end 350a of the inner tube is preferably tapered. Preferably, the inner tube 350 extends from the distal bend 341 through the center section 310. The center section 310 and the distal end 330 preferably have circular cross sections. Thus, the inner perimeter and outer perimeter of the handlebar are preferably circular. However, the bent section 340 preferably has an elliptical shape and an oval cross section. It has been found that bent sections having the preferred oval cross section provide additional rigidity. Since other parts typically are not attached at the bent section, a non-circular outer form may be used at the bent sections.

The center section preferably has an outer diameter of 22 mm. The bent section 340 preferably has a side diameter of 26 mm and a top diameter of 22 mm. The distal end 330 preferably has a diameter of 22 mm. The thickness of the wall at the ends is preferably 3.55 mm, and the thickness of the wall at the center is preferably at least 6.5 mm.

Figure 5:
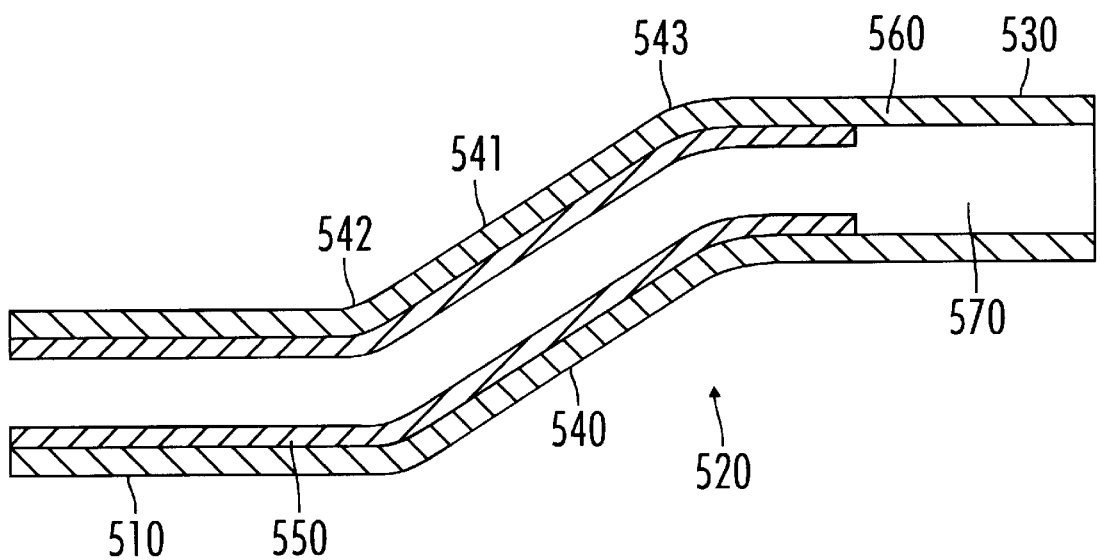
FIG. 5 is a partial front cross-section of an embodiment of a handlebar in accordance with an aspect of the invention.

Referring now to FIG. 5, there is shown a partial side section of a handlebar in accordance with the invention. This handlebar includes a center section 510 and an end section 520. The end section 520 includes a bent section 540 and a distal end 530. The bent section 540 comprises bend 542, a middle portion 541, and a distal bend 543. The handle bar comprises an outer tube 560 and an inner tube 550. In this embodiment, the outer diameter of the handlebar is constant. Thus, the outer diameter of the center section 510, the bent section 540 and the distal end 530 are all the same. Furthermore, the bent section in this embodiment has a circular cross-section.

As shown in FIG. 3A, the end 350a of the inner tube 350 is preferably tapered. More preferably, the entire inner tube is selectively tapered, such that the wall thickness declines gradually or in several decrements from the center to each of the ends.

When used, a handlebar in accordance with the invention provides superior strength and reduced vibration as compared to typical handlebars. This is in part because the inner tube and the outer tube move together. Furthermore, added rigidity is provided by insertion of the inner tube inside of the outer tube.

Figure 6A:
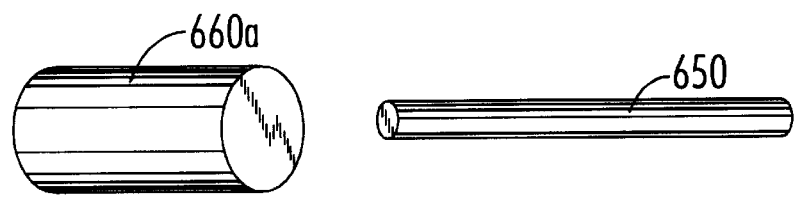
FIG. 6A is a side view of two blocks for use in the manufacture of a handlebar in accordance with an aspect of the invention.
Figure 6B:
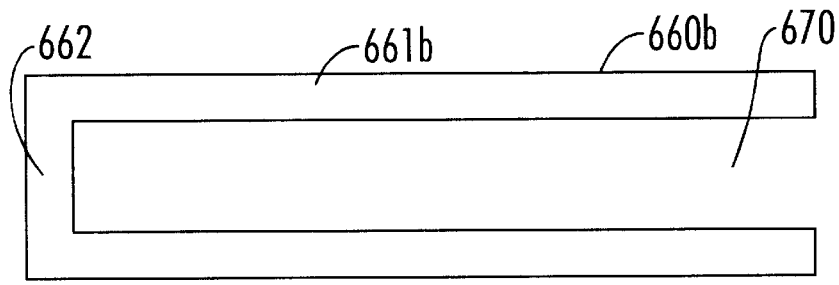
FIG. 6B is a side view of a cup after a first step in a manufacturing process in accordance with an aspect of the invention.
Figure 6C:
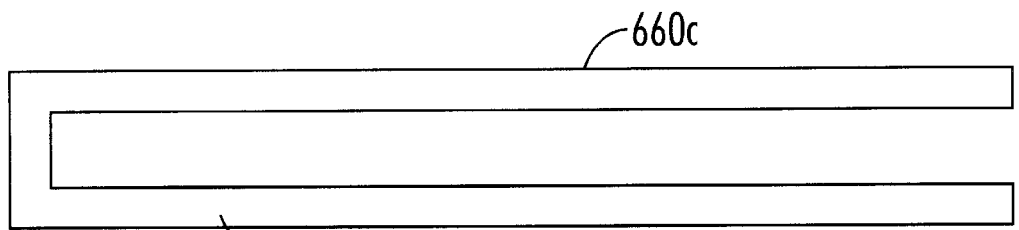
FIG. 6C is a side view of the cup shown in FIG. 6B after a second step in a manufacturing process in accordance with an aspect of the invention.
Figure 6D:
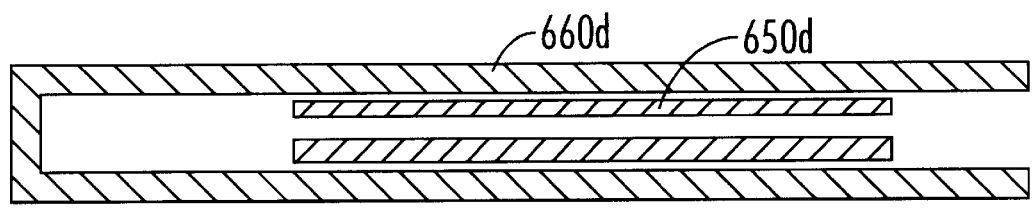
FIG. 6D is a side view of the cup shown in FIG. 6C after a third step in a manufacturing process in accordance with an aspect of the invention.
Figure 6E:
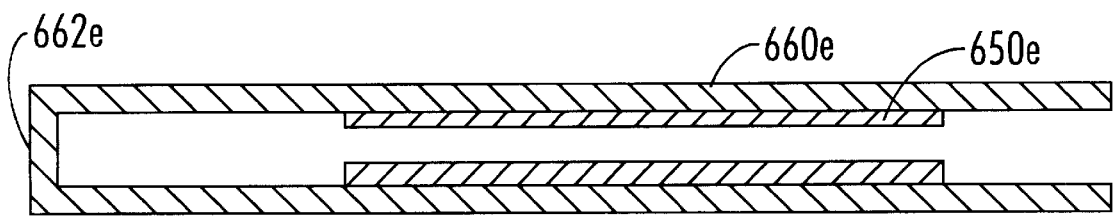
FIG. 6E is a side view of the assembly shown in FIG. 6D after a fifth step in a manufacturing process in accordance with an aspect of the invention.

There will now be described a preferred manufacturing process for the two-piece handlebar shown in FIGS. 3 and 5. Referring now to FIG. 6A, there is shown a first cylindrical block 660a and a second cylindrical block 650. Preferably, the cylindrical blocks comprise solid aluminum. The first block 660a will become the outer tube, and the second block 650 will become the inner tube. In a first step, the first block 660a is forged to a large cup 660b as shown in FIG. 6B. The cup 660b comprises a side wall 661b having circular cross-section and an end wall 662. The side wall 661b defines a hollow 670. In a second step, the cup 660b is heated and drawn to be longer and thinner (660c) as shown in FIG. 6C. In the second step, the side wall 661b is made thinner and more narrow. In a third step, the second block 650 is also forged to a cup and drawn but is shorter and of smaller diameter than the first cup 660c. Referring now to FIG. 6D, in a fourth step the inner cup 650d is inserted into the outer cup 660d. At this point in the process, the outer cup 660d has a larger inner diameter than the outer diameter of the inner cup 650d. Next, in the fifth step, the outer cup 660d is drawn a third time so as to fit the outer cup 660e tightly to the inner cup 650e. Finally, the end 662e is removed and the handlebar assembly is bent to a desired shape by well-known bending techniques.

A handlebar in accordance with the invention does not require pins, glue, or other holding means. The inner tube is secured within the outer tube by a friction fit. The friction fit provides additional advantages, since the inner bar and outer bar may flex at separate rates. Thus, stress buildup is additionally avoided.

The inner tube and outer tube need not be of aluminum. For example, the tubes may comprise plastic, fiberglass, steel, titanium, or any other material which provides a desired amount of strength. In addition, the inner tube and outer tube need not be made of the same material. For example, the outer tube may be made of extruded polyvinyl chloride (PVC) and the inner tube may be made of aluminum.

Furthermore, more than one inner tube may be provided. Several inner tubes of varying inner diameter may be disposed within an outer tube along the length of the handlebar. Thus, a tube having a small inner diameter would be disposed at the center, and tubes having a larger diameter would be disposed at other points, such as at the bent sections. Also, several inner tubes may be nested, such that in cross-section, several inner tubes may be seen. Accordingly, wall thickness may be varied simply by including several inner tubes.

It has been found that the double-tube embodiment of the invention provides substantially greater strength than typical cross-bar handlebars. The double-tube embodiment provides equivalent performance to typical handlebars having varying outer diameter. Hence, greater strength is provided by handlebars in accordance with the invention, without necessitating a crossbar.

Referring now to FIG. 7A, there is shown a front cross section of another embodiment of a handlebar in accordance with an aspect of the invention. This embodiment has the same general outward appearance as the first embodiment. However, in cross section, this single bar embodiment differs from the first embodiment and conventional handlebars. Unlike the first embodiment described above, the handlebar shown in FIG. 7A is constructed of a single tube 760. Like the first embodiment, this handlebar comprises a center section 710 and two end sections 720, 780. The end sections 720 and 780 are preferably mirror images of one another. The end section 720 comprises a bent section 740 and a distal end 730. The bent section includes a proximal bend 742, a middle portion 741 and a distal bend 743.

The thickness of the tube 760 is preferably continuously varied from one distal end 790 to the other distal end 730. Referring now to FIG. 7B, there is shown a cross section of the center section along reference lines 7B. As can be seen, the center section has a substantially circular cross-section. Referring now to FIG. 7C, there is shown a cross-section of the tube at the middle portion 741 of the bent section 740 of the handlebar of FIG. 7A. As can be seen, the tube 760 at this point has a substantially oval cross-section. Referring now to FIG. 7D, there is shown a cross-section of the handlebar of FIG. 7A at the distal end 730. At the distal end 730, the tube preferably has a circular cross-section. The thickness of the tube 760 is preferably greatest in the center section 710, and thinnest at the distal ends 730, 790. However, the diameter of the tube is preferably constant in the center section 710 and the distal ends 730, 740, and is preferably ⅞ inch. Although the bent section is preferably oval in cross-section, this part of the tube preferably also has a shortest diameter of ⅞ inch.

The single tube embodiment may be manufactured by drawing, or rolling. Differences in inner diameter may be achieved by expanding the inside of the tube at the ends, or by drilling or reaming out the inside of the tube wall.

Figure 4:
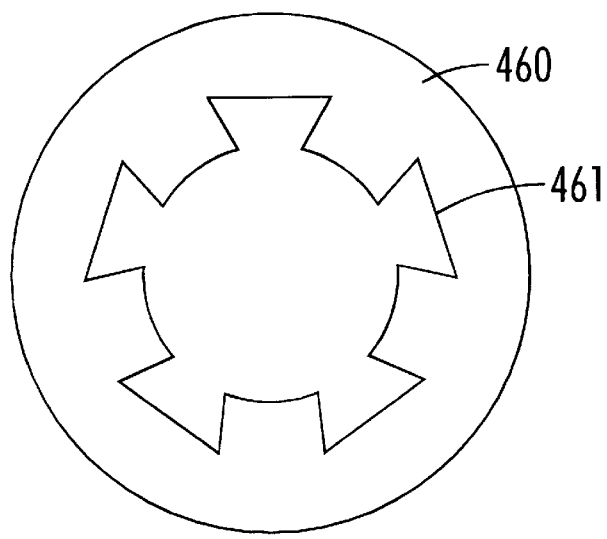
FIG. 4 is a cutaway side view of a handlebar in accordance with an aspect of the invention.

The cross-section of the tubes need not be perfectly circular. As shown in FIG. 4, an outer tube 460 may have a star-shaped inner surface as provided by cut outs 461. The central portion of the tube 460 may have other shapes, such as a square or hexagon. It has been found that the star shape as shown in FIG. 4 provides advantages to the handlebar of the present invention by reducing total weight of the handlebar without sacrificing significant strength. Other shapes may also be used, such as rectangles or other polygons.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A handlebar comprising an elongate member defining a first hollow and having a center section and two end sections, the center section adapted for use with a clamp, and the end sections adapted for use with grips; the end sections further each comprising a distal end; the member having along its length a cross-sectional outer diameter and an inner diameter; the member having the same outer diameter at the center section and at the distal ends, and having an inner diameter at the center section different from the inner diameter at the distal ends; the member comprising an outer tube and an inner tube securely disposed within the outer tube by a friction fit.

2. A handlebar as set forth in claim 1, wherein the outer diameter of the center section and the distal ends is ⅞ inch.

3. A handlebar as set forth in claim 1, wherein the end sections each comprise a proximal bend proximate the center section, a middle portion proximate the proximal bend, and a distal bend between the middle portion and the distal end.

4. A handlebar as set forth in claim 3, wherein the inner tube extends from at least the proximal bend of one end section through the center section to the proximal bend of the other end section.

5. A handlebar comprising an elongate member defining a first hollow and having a center section and two end sections, the center section adapted for use with a clamp, and the end sections adapted for use with grips; the end sections further each comprising a distal end; the member having a larger inner diameter at the distal ends than in the center section, the member comprising an outer tube and an inner tube securely disposed within the outer tube by a friction fit, the inner tube being a single piece and extending from one end section of the member through the center section to the other end section of the member.

6. A handlebar as set forth in claim 5, wherein the outer diameter of the center section and the distal ends is ⅞ inch.

7. A handlebar as set forth in claim 5, wherein the inner tube extends from at least the middle portion of one end section through the center section to the middle portion of the other end section.

8. A handlebar comprising:
    a first member comprised of an elongate tube having a length, a center section, first and second end sections and a uniform outer diameter throughout the length of the tube, each of the end sections having a proximal bend proximate the center section, a middle portion proximate the proximal bend, a distal bend proximate the middle portion and a distal end proximate the distal bend; and
    a second member securely disposed within the first member by a friction fit, the second member extending from at least the proximal bend of the first end section through the center section to the proximal bend of the second end section.

9. A handlebar as set forth in claim 8, wherein the second member is comprised of a second elongate tube.

10. A handlebar as set forth in claim 8, wherein the uniform outer diameter of the first member is ⅞ inch.

11. A handlebar comprising:
    a first member comprised of an elongate tube having a length, a center section and first and second end sections, each of the end sections having a proximal bend proximate the center section, a middle portion proximate the proximal bend, a distal bend proximate the middle portion and a distal end proximate the distal bend; and
    a second member securely disposed within the first member by a friction fit, the second member extending from at least the proximal bend of the first end section through the center section to the proximal bend of the second end section.

12. A handlebar as set forth in claim 11, wherein the second member is comprised of a second elongate tube.

13. A handlebar as set forth in claim 11, wherein the center section of the first member has an outer diameter of ⅞ inch.

* * * * *